No. 729,991. PATENTED JUNE 2, 1903.
L. ATWOOD.
TENDER FOR LOCOMOTIVES.
APPLICATION FILED MAR. 19, 1903.
NO MODEL. 2 SHEETS—SHEET 1.
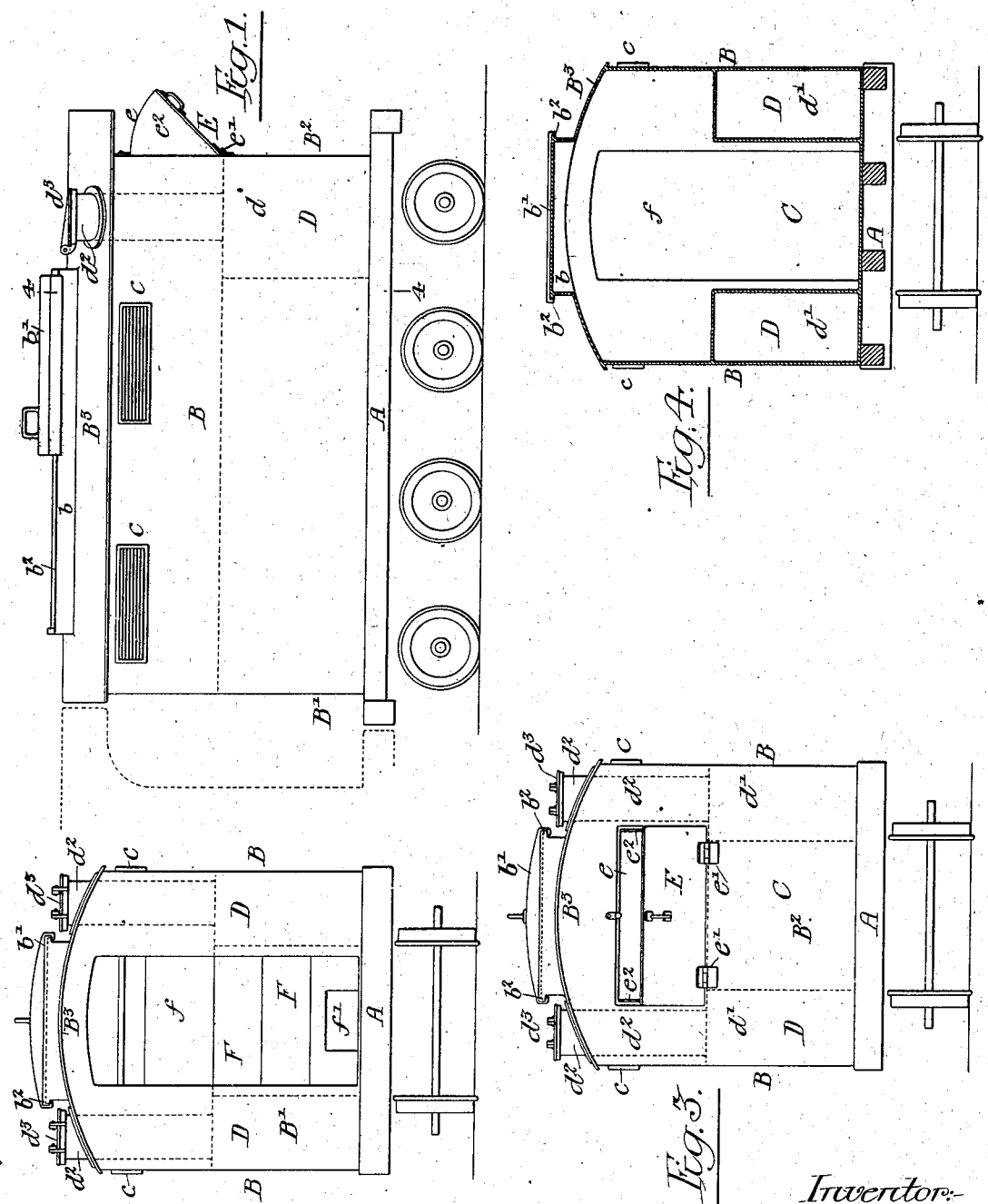
Witnesses:-
Inventor:-
Leonard Atwood,
by his Attorneys No. 729,991. PATENTED JUNE 2, 1903.
L. ATWOOD.
TENDER FOR LOCOMOTIVES.
APPLICATION FILED MAR. 19, 1903.
NO MODEL. 2 SHEETS—SHEET 2.
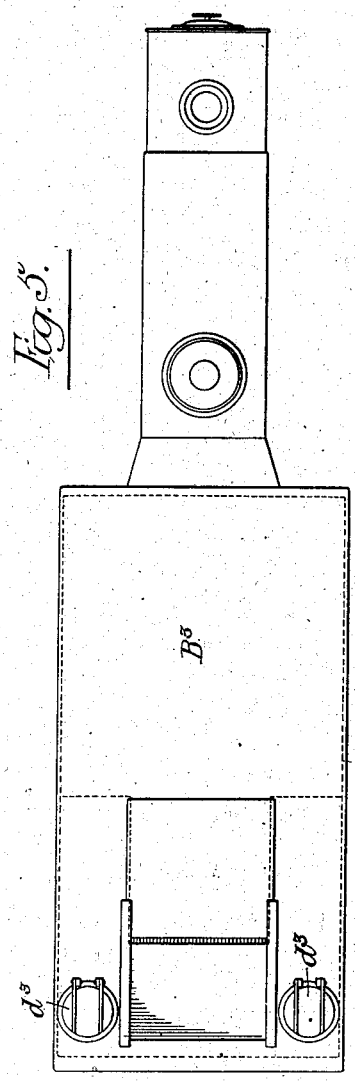
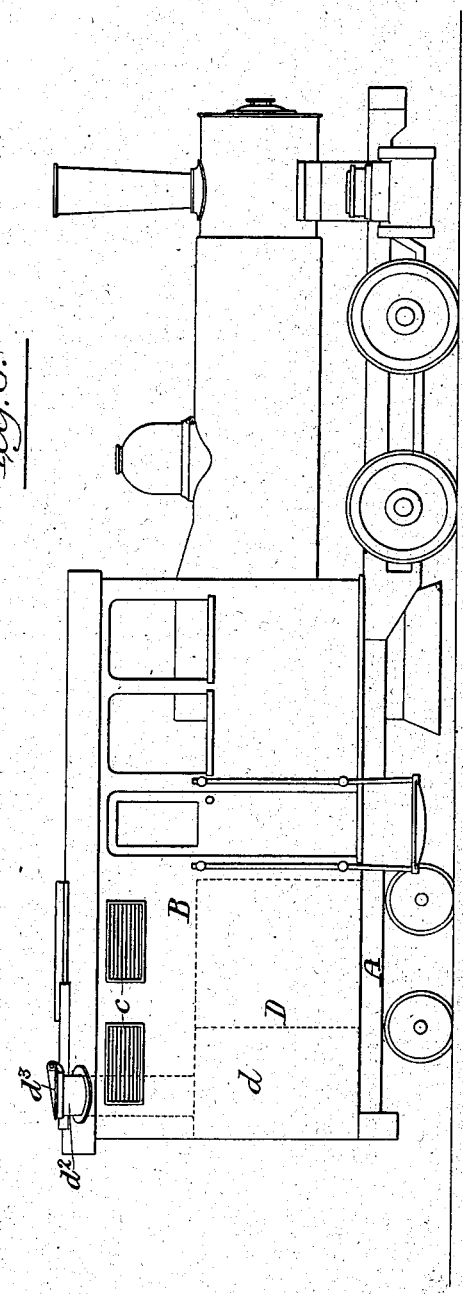
Witnesses:-
Inventor:-
Leonard Atwood,
by his Attorneys No. 729,991. Patented June 2, 1903.

UNITED STATES PATENT OFFICE.

LEONARD ATWOOD, OF PHILADELPHIA, PENNSYLVANIA.

TENDER FOR LOCOMOTIVES.

SPECIFICATION forming part of Letters Patent No. 729,991, dated June 2, 1903.

Application filed March 19, 1903. Serial No. 148,632. (No model.)

*To all whom it may concern:*

Be it known that I, LEONARD ATWOOD, a citizen of the United States, residing in Philadelphia, Pennsylvania, have invented certain Improvements in Tenders for Locomotives, of which the following is a specification.

The main object of my invention is to construct a protected tender for a locomotive in which the fuel is under cover and the storage-space for fuel increased; and a further object is to protect the engineer and fireman and to prevent smoke and cinders being drawn down to the front portion of the train.

In the accompanying drawings, Figure 1 is a side view of a tender, illustrating my invention. Fig. 2 is a view of the front end of the tender. Fig. 3 is a view of the rear end of the tender. Fig. 4 is a transverse sectional view on the line 4 4, Fig. 1. Fig. 5 is a plan view showing a locomotive and tender combined, and Fig. 6 is a side view of Fig. 5.

I have omitted the details of the running-gear of the tender and also the details of the locomotive, as they form no part of my present invention, as any suitable running-gear may be used, and the tender can be combined with any type of locomotive.

Mounted on the frame A of the tender are the side walls B B, front wall B', and rear wall $B^2$. These walls support the roof $B^3$, which is preferably the same height as the roof of the cab of the locomotive and has the same lateral curvature, so that the roof of the tender is a continuation of the roof of the cab, as shown by dotted lines in Fig. 1.

Within the tender is a tank D, having a portion $d$, extending across the rear of the tender, and side portions $d'$, which extend to the front wall B', leaving a space C in the center for the storage of fuel.

$d^2$ $d^2$ are intake water-tubes which extend from the upper portion of the tank D through the roof $B^3$. These water-tubes are provided with suitable hinged covers $d^3$, which can be thrown back when it is desired to fill the tank. I have provided one of these tubes on each side of the tender; but a single tube may be used in some instances.

In the roof of the cab is an opening $b$, provided with a cover $b'$, which is arranged to slide in guides $b^2$ on the roof, so that when it is desired to charge the tender with fuel from above all that is necessary is to push back the slide.

In the side walls of the tender, near the roof, are ventilators $c$ $c$, which permit ventilation and allow for the escape of gases.

In the rear wall $B^2$ of the tender, above the tank D, is an opening $e$, and hinged to the rear wall at $e'$ is a door E, having side wings $e^2$. This door can be opened, as shown in Fig. 1, to a limited extent, so that the door and its side extensions will act as a chute when it is desired to load the tender with fuel from this point. The door can also be opened for ventilation, if desired.

In the front wall B' of the tender is an opening $f$, which may be closed by sectional doors F, either entirely removable from the cab or so hinged as to swing into the tender when the height of the fuel is low. In the bottom section is an opening $f'$, from which the fireman can remove fuel from the tender. Thus by the arrangement shown I can carry considerably more fuel than in a tender as ordinarily constructed without increasing the size of the tender and thoroughly protect the fuel from the weather.

My invention is especially applicable to locomotives used in northern climates, where the winters are comparatively long and extremely cold and if the fuel is not protected it is hard to remove from the tender. The inclosing of the tender also protects the water-tank.

In Figs. 5 and 6 I have shown a type of locomotive in which the tender is mounted on the same frame as the locomotive. In this instance the roof of the tender is a continuation of the roof of the cab, and there is a suitable doorway between the cab and the tender, and a door is provided, so that the compartment, including the cab and the tender, is entirely closed.

It will be noticed in referring to the drawings that the side walls of the tender are practically an extension of the outer walls of the tank and the roof is a continuation of the roof of the cab and conforms to the curve and shape of the cab-roof. In some instances the tank may be a separate structure within the walls of my improved tender, so as to form an air-space entirely around the tank.

I claim as my invention—

1. The combination in a cab, of a water-tank mounted on the frame, side walls extending above the water-tank and forming a continuation of the walls of the said tank, a roof carried by the side walls parallel with the roof of the cab of the locomotive and having the same curvature, an opening in the roof communicating with the fuel-chamber, and a tube extending from the water-tank through the roof, substantially as described.

2. The combination in a tender of a locomotive, of a water-tank mounted on the frame of the tender, side walls and end walls extending above the tank, a roof supported by the side and end walls and conforming in shape to the roof of the locomotive-cab and having a fuel-opening, a tube communicating with the water-tank, an opening in the front walls, and ventilators in the side walls above the water-tank, substantially as described.

3. The combination in a tender, of a frame, a water-tank mounted on the frame, side and end walls extending above the water-tank and forming a fuel-compartment, a roof in line with the roof of the cab of the locomotive and conforming in shape with the cab-roof, an opening in the rear wall of the tender, a hinged door for the said opening acting when open as a hopper, and an opening in the front wall of the tender, substantially as described.

4. The combination of a tender, a frame, a water-tank mounted thereon, side walls and end walls extending above the water-tank, a roof supported by the side walls and in line with the roof of the cab of the locomotive, an opening for charging the tender with fuel and two intake water-pipes communicating with the water-tank and extending through the roof, one on one side of the tender and the other on the other side, substantially as described.

5. The combination of a tender, a frame, a water-tank mounted on the frame, side walls and end walls extending above the water-tank, and a roof carried by the said walls, an opening in the roof, a slide covering the said opening, water-intake pipes extending from the water-tank up through the roof, one on each side of the tender, covers for the said pipes, an opening in the rear wall of the tender, a hinged door for said opening having side extensions, the door when open acting as a hopper, and an opening in the front walls of the tender, substantially as described.

In testimony whereof I have signed my name to this specification in the presence of two subscribing witnesses.

LEONARD ATWOOD.

Witnesses:
WILL. A. BARR,
JOS. H. KLEIN.